United States Patent
Kraemer et al.

(10) Patent No.: US 10,243,964 B2
(45) Date of Patent: Mar. 26, 2019

(54) ZERO KNOWLEDGE REPUTATION SERVICE

(71) Applicant: International Business Machines Corporation, Armonk, NY (US)

(72) Inventors: James R. Kraemer, Santa Fe, NM (US); Jeb R. Linton, Herndon, VA (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 15/258,297

(22) Filed: Sep. 7, 2016

(65) Prior Publication Data
US 2018/0069849 A1    Mar. 8, 2018

(51) Int. Cl.
*H04L 29/06* (2006.01)
(52) U.S. Cl.
CPC .................... *H04L 63/105* (2013.01)
(58) Field of Classification Search
CPC .................................................. H04L 63/0823
See application file for complete search history.

(56) References Cited

U.S. PATENT DOCUMENTS

2007/0106892 A1* 5/2007 Engberg ............... G06Q 20/02
                                                    713/168
2009/0031125 A1* 1/2009 Bjorn ..................... H04L 9/0825
                                                    713/155
2013/0151540 A1* 6/2013 Pathak ................ G06Q 10/101
                                                    707/754
2015/0363777 A1* 12/2015 Ronca ................. G06Q 20/401
                                                    705/75

OTHER PUBLICATIONS

Gmaxwell, "Really really ultimate blockchain compression: CoinWitness", Aug. 19, 2013, https://bitcointalk.org/index.php?topic=277389.0;all, pp. 1-34.
U.S. Appl. No. 14/970,966, filed Dec. 16, 2015.
U.S. Appl. No. 14/858,389, filed Sep. 18, 2015.
U.S. Appl. No. 14/752,230, filed Jun. 26, 2015.

* cited by examiner

*Primary Examiner* — Kambiz Zand
*Assistant Examiner* — Thanh H Le
(74) *Attorney, Agent, or Firm* — Fleit Gibbons Gutman Bongini Bianco PL; Jon A. Gibbons

(57) ABSTRACT

A reputation service running on a server, for example as a cloud server, includes receiving a request from a first user device and a second user device. The reputation management for both internet services and service providers, as well as the individuals who provide reputation feedback on those services and providers and each other. The service operates in zero-knowledge verifiable computing in order to enable strong assurance of anonymity among all participating parties. The method includes receiving, from a user using a zero-knowledge protocol to ensure privacy of the user, a rating with a unique token associated with the user, and identifier of a party to be rated. The party in one example is a person or a business entity. The unique token in one example is one or more of a tax identifier, an e-passport, or a private key of a DNS Domain registered with a certificate authority.

20 Claims, 6 Drawing Sheets

ZERO KNOWLEDGE REPUTATION SERVICE

BACKGROUND

The present invention generally relates to services, and more particularly to reputation services that maintain the privacy of users.

General purpose reputation services are difficult to implement with robust protection from fraud and previously impossible to implement without specific knowledge of unique or demonstrably rare information on contributors to the system. Current successful reputation systems are maintained by providers, such as, Ebay and Amazon, which depend on the ability to link personal information, including unique credit card numbers, names, and addresses, to prevent abuse. Abuse attacks on reputation services are common. Typical attacks are Sybil attacks and Astroturfing.

Existing reputation systems cannot track individuals across multiple providers of goods and services, thus making it possible for individuals to provide false positive or negative feedback affecting the reputation of providers with no concern for their own reputation.

SUMMARY

One embodiment of a reputation service is a computer-implemented method. The method includes receiving, from a user using a zero-knowledge protocol to ensure privacy of the user, a rating with a unique token associated with the user, and identifier of a party to be rated. The party in one example is a person or a business entity. The unique token in one example is one or more of a tax identifier, an e-passport, or a private key of a DNS Domain registered with a certificate authority.

Next, the process continues to confirm if the unique token is associated with the user. In response to confirming the unique token is associated with the user, updating a rating of the party using zero-knowledge verifiable computing. In one example, a weighting factor is applied to the rating. The updating the rating of the party using zero-knowledge verifiable computing includes applying a weighting factor to the rating. The weighting factor is dependent on one or more of relative strength of rating on a scale from negative to positive, an identified group of tokens in which the unique token is a member, or a frequency of ratings for the party from the unique token associated with the user.

In another example, a composite set of quantities of the party within a given context is used in the rating. The composite set of quantities of the party within a given context includes a position of the party within a group or association, a size of a group or association in which the party is a member, or a combination thereof.

The group includes one or more of buyers of a service or product, sellers of a service or product, service providers, service consumers, ideological groups, political groups, or combination thereof.

In response to the updating of the rating being successful, sending to the user an acknowledgment using the zero-knowledge protocol.

The zero-knowledge verifiable computing includes but is not limited to any of succinct computational integrity and privacy (SCIP) technique, zero-knowledge succinct non-interactive argument of knowledge (zk-snark) technique, or a probabilistically checkable proof (PCP) technique. The proof can be whether the program is using at least one of trusted computing, secure boot attestation, or a combination or derivative technique thereof.

Other embodiments of the invention include a system and a computer program product.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
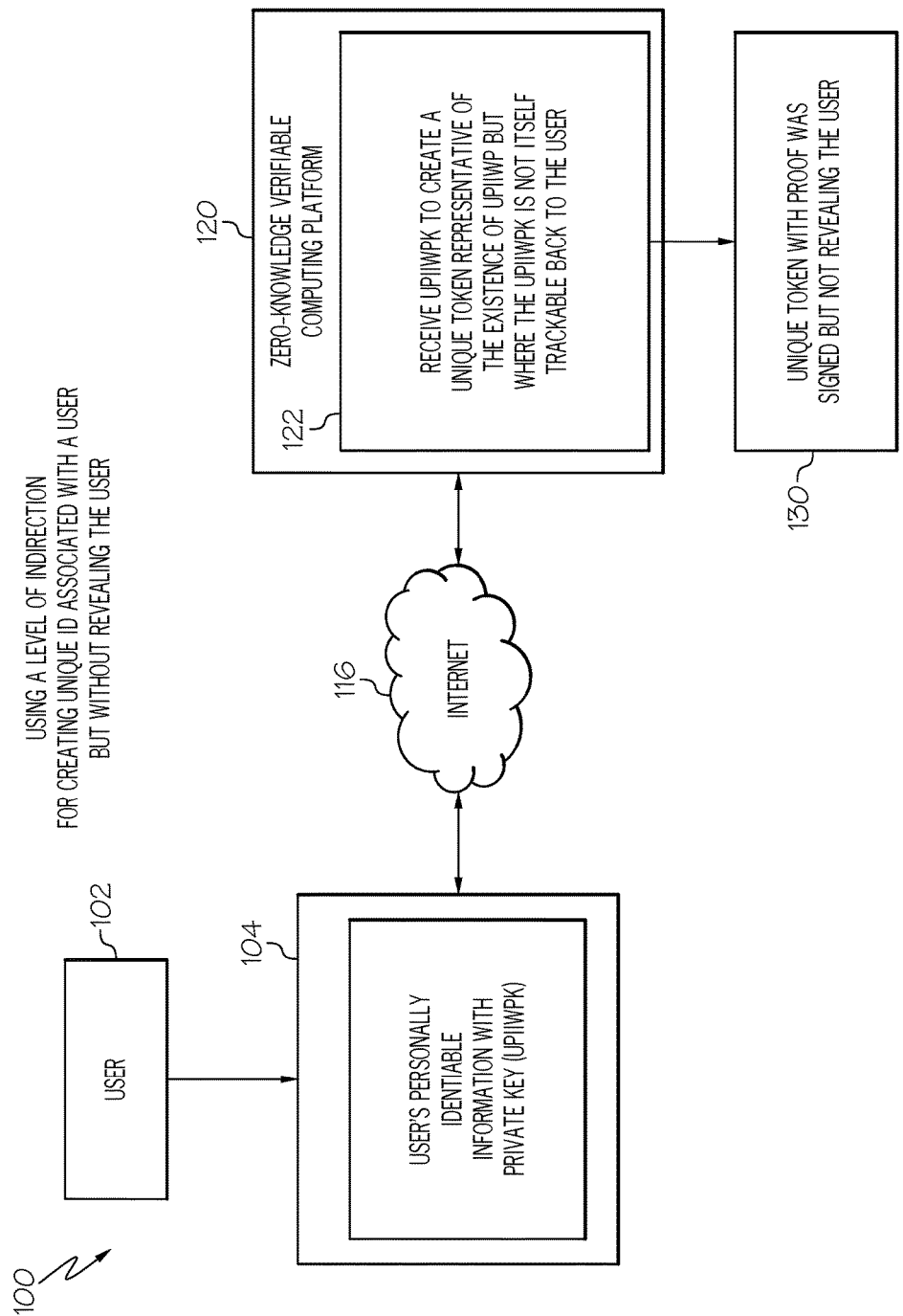
FIG. 1 is a functional diagram illustrating one example of using indirection to create a unique token for a specific user without revealing which user is associated with the token, in accordance with an embodiment of the present invention.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention is presented for purposes of illustration and description, but is not intended to be exhaustive or limited to the invention in the form(s) disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

An embodiment of the present invention is provided as part of a cloud service, which ties the reputation of services on the internet to the reputations of individuals providing feedback on those services. The present invention functions across many services and providers. In some embodiments, the service operates in zero-knowledge verifiable computing in order to improve confidence of anonymity among all participating parties. It can provide a reasonable basis for trusted transactions between unknown parties, but not disclosed in current literature.

This individual service is just a one example. In other examples, this reputation service is tied to other services such as background check services. Also this reputation services can tie individuals to other individuals and any participant-to-any other participant.

The present invention provides an anonymous service which can reliably collect and maintain reputation information on both cloud services and individuals that use and provide feedback on them. Existing reputation systems rely on service providers, which collect sensitive personal information on individuals and on providers of goods and services.

An embodiment of the inventive system defines and ties a unique set of quantified, normalized reputation characteristics to individuals participating in the system.

By tying reputations to an individual's e-passport identifier, a corporation's business tax ID or the private key of a DNS Domain registered with a Certificate Authority, or any similarly unique token to the participant's behavior as recorded through anonymous feedback from other system participants, the system motivates individual participants to "behave well" as judged by the overall community of participants, without compromising the individual's privacy or revealing information that could be used to identify any individual participant.

The overall reputation algorithm for the reputation system may be as simple as a tally of unitary "up votes" and "down votes" by the overall community or more complex algorithms making use of weighting factors such as seniority and reputation within a closed sub-community, the number of users of a service provided by a corporate body such as a commercial enterprise, or any number of other factors. Some embodiments depend on a zero-knowledge method of gathering and maintaining an individual's or a corporate body's reputation score, not on the specific tally algorithm.

Provability/Verifiability: The disclosed system is a set of services advertised in a distributed peer to peer network of cloud services, each of which would be verifiable as valid and untampered -with using Probabilistically Checkable Proofs (PCPs), Zero-Knowledge Succinct Non-Interactive Arguments of Knowledge (ZK-SNARKs), Succinct Computational Integrity and Privacy (SCIP), or similar methods of verified computational integrity.

Repeat Feedback: The problem of a single participant providing repeated feedback regarding another participant can be solved using an algorithm which discounts the value of repeat feedback. For example, the first up vote or down vote by one participant on another may count as one reputation-unit, with each subsequent vote counting as half the value of the preceding vote, asymptotically approaching two reputation-units.

Sybil Attacks: The well-known problem of Sybil Attacks is based on the ability of an individual or group to set up many apparent participants which vote as a bloc. This attack on the system is foiled by the use of unique or nearly-unique participation tokens such as e-passport identifiers or tax IDs which are relatively difficult to amass in large enough numbers to have enough effect to warrant the trouble of accumulating them.

Ideological or Political Communities: One of the more problematic issues for the reputation system is the ability of an ideologically similar group to up-vote or down-vote en masse, potentially destroying or unduly elevating the reputation of an individual or corporate participant. The simplest, though imperfect, method of managing such effects is through simple numbers with each vote equating to one reputation i.e., discounting repeat votes as described above. In this case, participants rely on the relatively large number of positive votes from their own community to balance out those of the opposing community. More sophisticated algorithms may be employed to provide greater protection, by identifying ideological blocs as statistical cohorts and discounting their grouped feedback, similarly to the repeat feedback method described above. Still more sophisticated methods may track a range of reputation information rather than a single quantity, as in the case of the composite reputation described below.

Composite Reputations: An optional extension of the basic reputation system would track a participant's reputation as a composite set of quantities representing reputation within a particular context. For example, reputation could be tracked based on membership in and prominence and size of particular cohorts or groups or association such as:
  Buyers.
  Sellers.
  Service Providers or Service Consumers.
  Buyers, Sellers, Providers and Consumers in the context of a particular service or class of services.
  Ideological or political groups, as identified algorithmically or by the participant's attestation of membership in one or more of these groups.

A composite reputation score, in one example, is determined either in general based on size or prominence of each group or cohort, or specific to the context of the participant querying the system for another participant's reputation score, optionally customizable according to the preference of the user performing the query.

Non-Limiting Definitions

The terms "a", "an" and "the" are intended to include the plural forms as well, unless the context clearly indicates otherwise.

The terms "comprises" and/or "comprising", when used in this specification, specify the presence of stated features, steps, operations, elements, and/or components, but do not preclude the presence or addition of one or more other features, integers, steps, operations, elements, components, and/or groups thereof.

The phrase "identifier of a person" means a pointer or link to a person. The pointer is usually pointing to a person's information stored in a file or database.

The term "rating" or "ranking" means a ranking of a person or business entity, such as a company, LLC, PA, etc., based on a comparative assessment of their quality, standard, or performance.

The term "unique token" means digital certificate signed by a trusted certificate authority, such as epassport, tax identifier, or private key of DNS domain registered with a certificate authority, in which the signature can be validated without revealing which user it is associated to the epassport.

The phrase "verifiable computing" in cryptography, is a method by which one party, the prover, or as used in this patent a "user", can prove to another party, the verifier as used in this patent a "content provider" or "service provider" providing content that a program has been or is being executed correctly and without modification or tampering.

A "zero-knowledge protocol", in cryptography, is a method by which one party, the prover, or as used in this patent a "user", can prove to another party, the verifier as used in this patent a "service provider" providing a service that a given statement is true, without conveying any information apart from the fact that the statement is indeed true.

The phrase "zero-knowledge verifiable computing" is a method of verifiable computing which can also function as a zero-knowledge protocol. Examples of zero-knowledge verifiable computing are succinct computational integrity and privacy (SCIP) technique, zero-knowledge succinct non-interactive argument of knowledge (zk-snark) technique, and the zero-knowledge protocol with a probabilistically checkable proof (PCP) technique.

Using Indirection to Create a Unique Identifier

FIG. 1 is a functional diagram 100 illustrating one example of using indirection to create a unique token for a specific user without revealing which user is associated with the token, in accordance with the present invention. As depicted, a user 102, makes available the user's personally identifiable information with a private key ("UPIIWPK") 104. By way of example and without limitation, examples of uniquely identifiable information include: an epassport, a tax id, or a private key of DNS domain registered with a certificate authority. An epassport is also known as a biometric passport. It looks like a traditional passport book, but it contains an electronic chip that is encoded with the same information found of the passport (surname, given name, date of birth and sex). It also includes a digital picture of the bearer's face.

The user can use any computer system, for example, information processing systems such as desktop computers, laptop computers, servers, wireless devices (e.g., mobile phones, tablets, personal digital assistants), and the like, to send the UPIIWPK in order to create a unique token 122 on system 120.

In some embodiments, the public network 116 and computing platform 120 is part of a cloud computing environment (collectively represented in FIG. 1 by the combination of network 116 and platform 120). Cloud computing will be discussed in more detail with reference to FIG. 5. It should be noted however, that various embodiments of the present invention are applicable to non-cloud computing environments as well. With reference to the example depicted in FIG. 1, a user 102 is shown communicatively coupled to computing platform 120 via a public network 116 such as the Internet.

In one example, a cloud user (via a user systems 102) can use a cloud environment 116, 120 to create a unique token 122 using a zero-knowledge verifiable computing platform 120 after receiving the user's personally identifiable information with private key (UPIIWPK). The output is a unique token with proof it was signed but without revealing which user signed it 130.

Reputation Service Operating Environment

Figure 2:
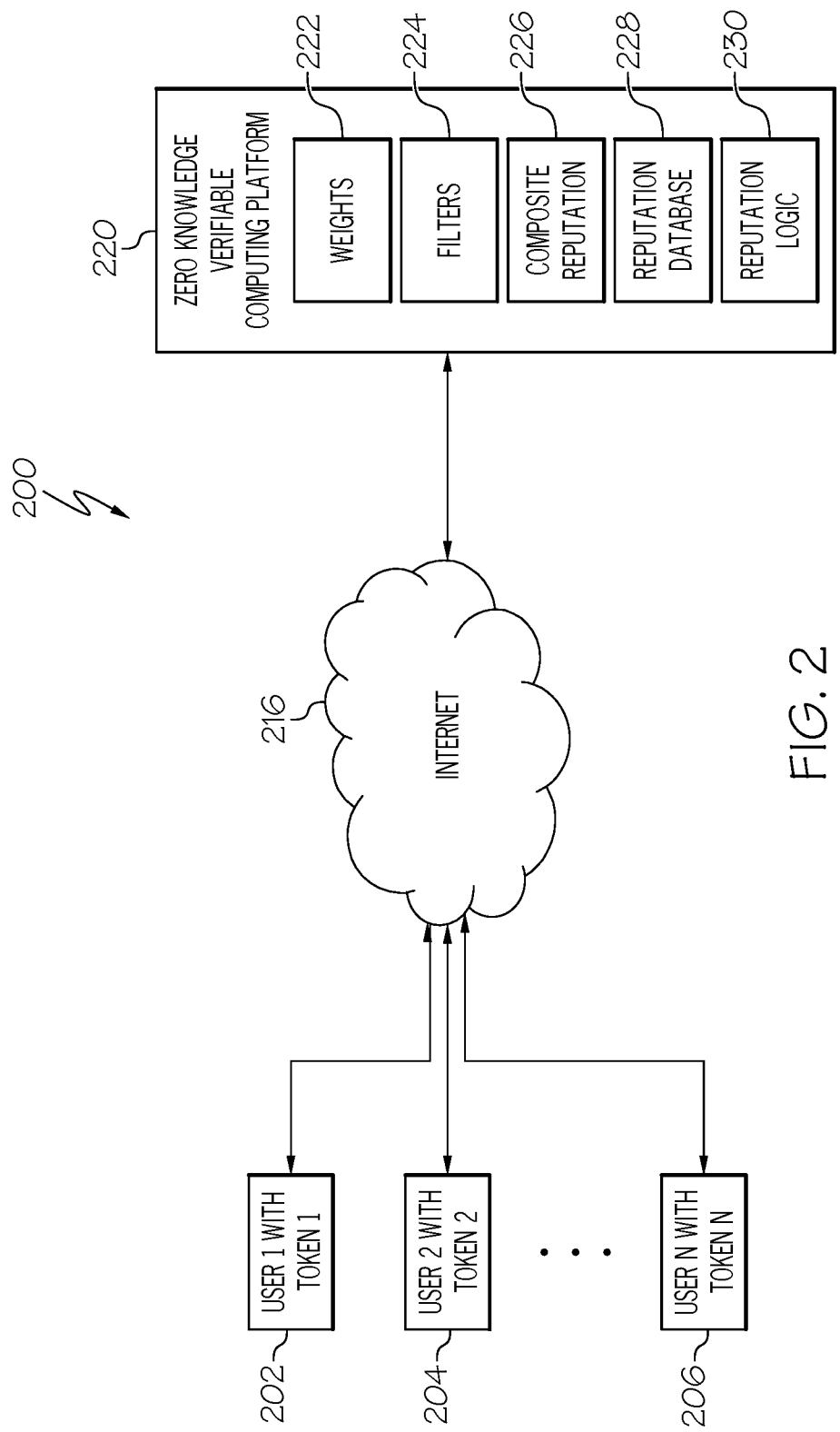
FIG. 2 is a functional diagram illustrating a reputation service using the unique token of FIG. 1, in accordance with an embodiment of the present invention.

FIG. 2 is a functional diagram 200 illustrating a reputation service using the token of FIG. 1. Again, it should be noted that although the following discussion is directed to a cloud computing environment various embodiments are application to non-cloud computing environments as well. With reference to the example depicted in FIG. 2, one or more client/user systems 202, 204, 206 can be communicatively coupled to computing platform 220 via a public network 216 such as the Internet. The user systems 202, 204, 206 can include, for example, information processing systems such as desktop computers, laptop computers, servers, wireless devices (e.g., mobile phones, tablets, personal digital assistants, etc.), and the like.

In a cloud computing embodiment, user systems 202, 204, 206 can access the cloud computing environment 216, 220 via one or more interfaces (not shown) such as a web browser, application, etc. to utilize resources provided by a zero knowledge verifiable computing platform 220. The computing platform 220 includes a reputation database 228 which can be searched to find the ranking of a party, under control of reputation logic 230. The platform 220 can also include a composite reputation 226, filter(s) 224 and weight(s) 222. As previously described above, composite reputation 226 is an optional extension of the basic reputation system. The composite reputation 226 can track a participant's reputation as a composite set of quantities representing reputation within a particular context. For example, reputation could be tracked based on membership in and prominence and size of particular cohorts or groups or association. In some embodiments, filter 224 and weight(s) 222 work cooperatively with the composite reputation 226 to filter out a particular group or association. Weight(s) 222 may also be applied to reflect prominence in the group.

Reputation Service Flow

Figure 3:
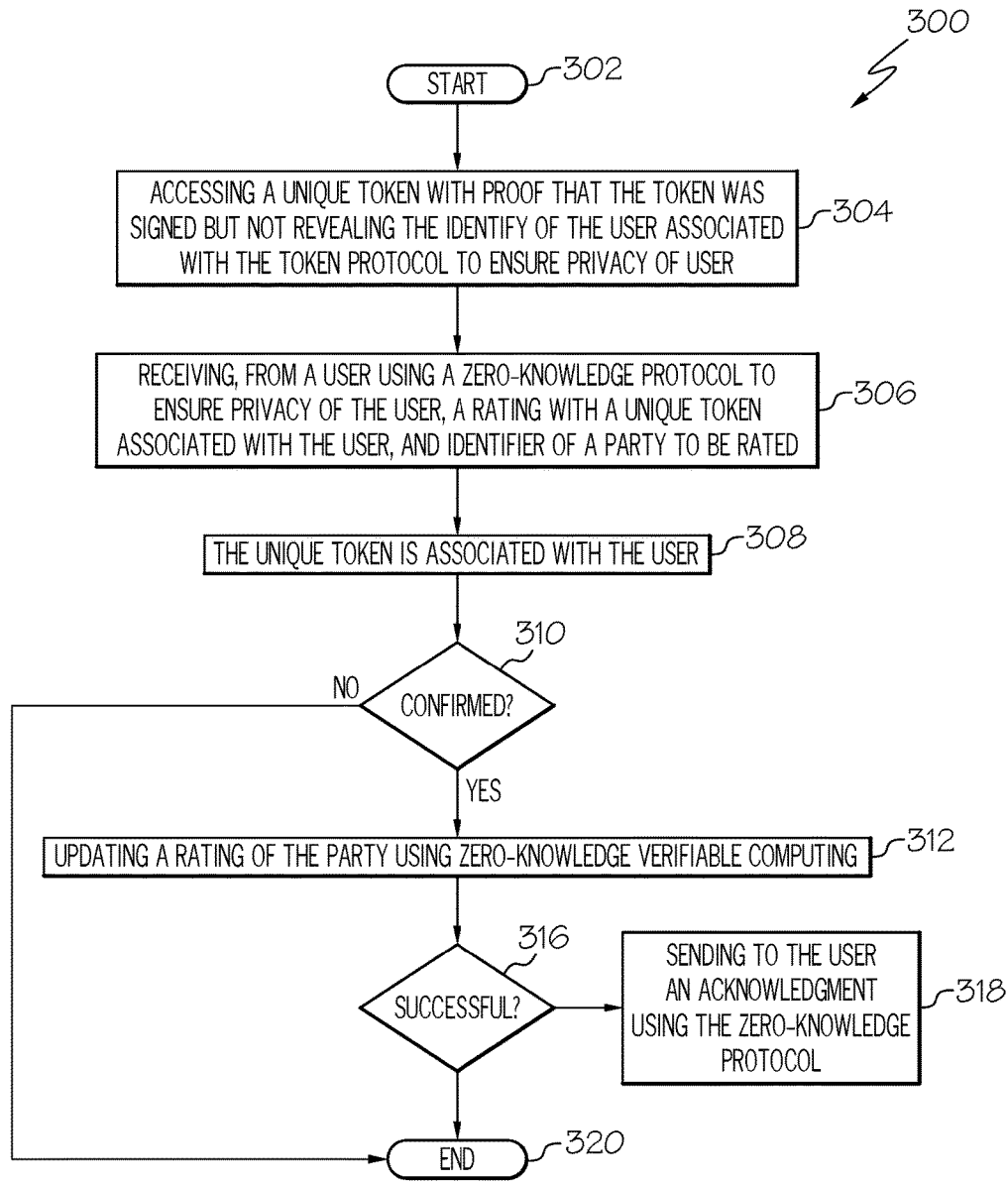
FIG. 3 is a flow diagram illustrating ranking a party as part of the reputation service, in accordance with an embodiment of the present invention.

FIG. 3 is a flow diagram illustrating ranking a party as part of the reputation service and to ensure privacy by content users, in accordance with an embodiment the present invention. The process starts, for example by user 102 in FIG. 1 initiating a reputation process, in step 302 and then proceeds to step 304.

In step 304, a unique token, such as was created from FIG. 1, 130 is accessed. The unique token includes proof that it was signed but does not reveal the identity of the user associated with the token. The process then proceeds to step 306.

In step 306, the process continues with receiving from a user, for example user 102 in FIG. 1, a zero-knowledge protocol to ensure privacy of the user, and a rating along with a unique token associated with the user. The rating can be (as previously defined above), a ranking of a person or business entity, such as a company, LLC, PA, etc. The process then proceeds to step 308.

In step 308, the unique token is reviewed to determine if it is associated with the user, for example by the UPIIWPK. If it is confirmed in step 310, the process continues to step 312. Otherwise the process proceeds to step 320.

In step 312, (given that the unique token has been confirmed in step 310), the rating of the party, e.g. business entity or person associated with the identifier received from the user is updated. In the event the rating does not previously exist for the party associated with the identifier, a rating is created and updated using the rating received from the user. This update of the rating is performed using zero-knowledge verifiable computing.

A weighting factor can also be applied to the rating. The weighting factor is dependent on one or more of a relative strength of rating on a scale from negative to positive, an identified group of tokens in which the unique token is a member, or a frequency of ratings for the party from the unique token associated with the user.

The weighting factor can be made explicitly dependent on one or more quantities associated with the party (e.g. business entity or person associated with the identifier received from the user) in a given context. The composite set of quantities associated with that party within a given context can include consideration of one or more of: a position of that party within a group, or a size of a group in which that party is a member.

The process next proceeds to step 316.

In step 316, a determination is made as to whether the updating of the rating for the party identified by the user is successful. If the result is determined as unsuccessful, the process proceeds to step 320. If the result is determined as successful, the process proceeds to step 318.

In step 318, the user receives an acknowledgement using the zero knowledge protocol.

In step 320, the process ends.

In another embodiment, a user may pay for this reputation service. Anonymous payments include a cryptocurrency.

Generalized Computing Environment

Figure 4:
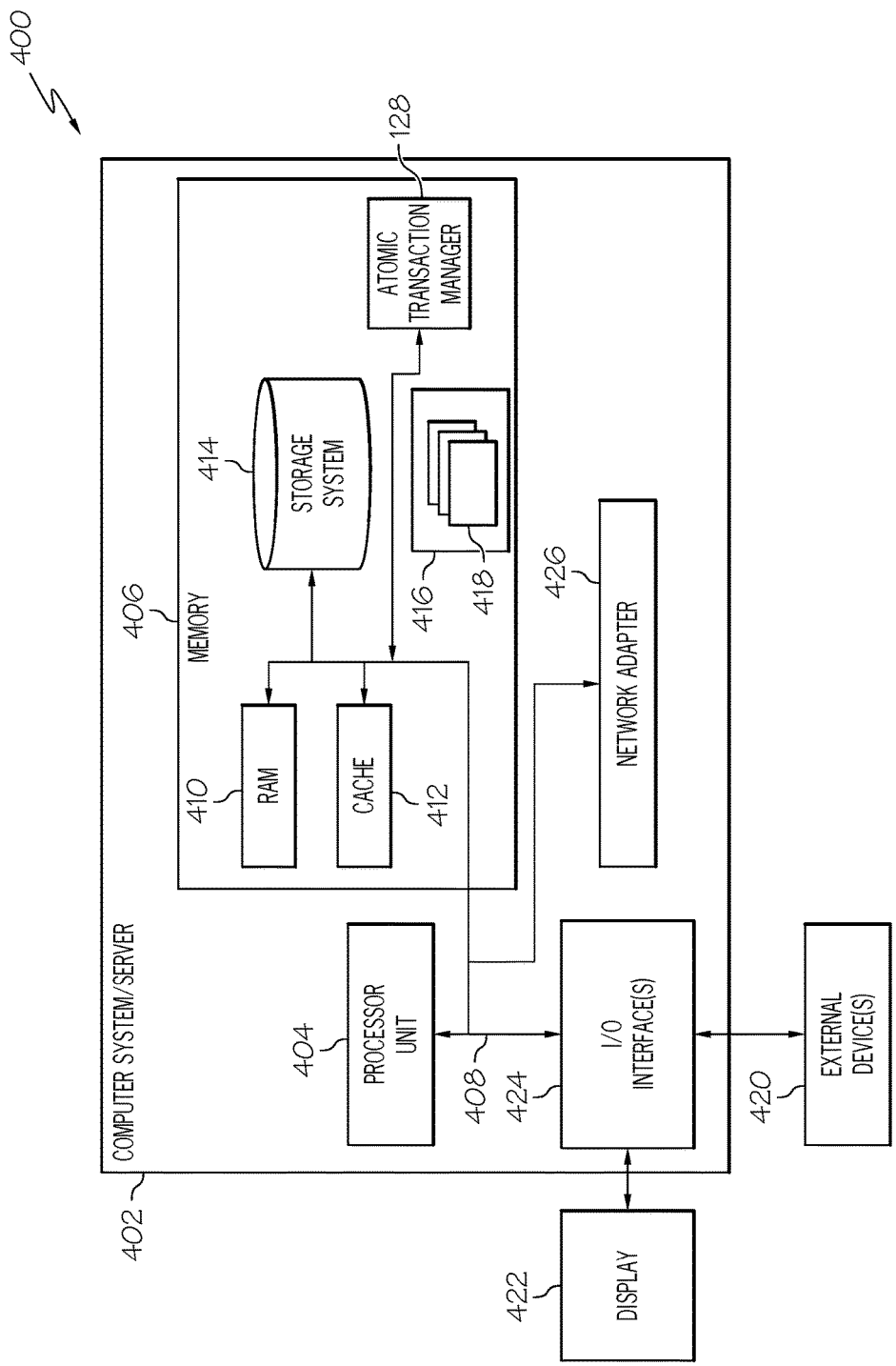
FIG. 4 illustrates one example of a cloud computing node, in accordance with an embodiment of the present invention.

FIG. 4 illustrates one example of a processing node 400 for operating the zero-knowledge verifiable computing platform 120, in accordance with an embodiment the present invention. This example is not intended to suggest any limitation as to the scope of use or functionality of embodiments of the invention described herein and the processing node 400 is capable of being implemented and/or performing any one or more of the functionalities set forth herein.

As depicted, processing node 400 can be a computer system/server 402, which is operational with numerous other general purpose or special purpose computing system environments or configurations. Examples of well-known computing systems, environments, and/or configurations that may be suitable for use with computer system/server 402 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 402 may be described in the general context of computer system-executable instructions, such as program modules as further described below, being executed by a computer system. Generally, program modules may include routines, programs, objects, components, logic, data structures, and so on that perform particular tasks or implement particular abstract data types. Computer system/server 402 may be practiced as one node of a distributed cloud computing environment, an example of which will be described with reference to FIG. 5. In such cloud computing environments, tasks are performed by remote processing devices that are linked through a communications network. In a distributed cloud computing environment, program modules 418 may be stored in one or more local and remote computer system storage media, including memory storage devices.

As shown in FIG. 4, computer system/server 402 in cloud computing node 400 is shown in the form of a general-purpose computing device. The components of computer system/server 402 may include, but are not limited to, one or more processors or processing units 404, a system memory 406, and a bus 408 that couples various system components including system memory 406 to processor 404.

Bus 408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media.

System memory 406, in one embodiment, implements the functions of FIG. 2 and the processes described with reference to FIG. 3. The system memory 406 can include computer readable media in the form of volatile memory, such as random access memory (RAM) 410 and/or cache memory 412. Computer system/server 402 may further include other removable/non-removable, volatile/non-volatile computer system storage media. By way of example only, storage system 414 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 408 by one or more data media interfaces. As will be further depicted and described below, memory 406 may include at least one computer program product having a set (e.g., at least one) of program modules 418 stored that are configured to carry out functions of various embodiments of the invention.

Program/utility 416, having a set (at least one) of program modules 418, may be stored in memory 406 by way of example, and not limitation, as well as an operating system, one or more application programs, other program modules, and program data. Each of the operating system, one or more application programs, other program modules, and program data or some combination thereof, may be adapted to a networking environment. In some embodiments, program modules 418 carry out the functions and/or methodologies of various embodiments of the invention described herein.

With reference again to FIG. 4, computer system/server 402 may also communicate with one or more external devices 420 such as a keyboard, a pointing device, a display 422, etc. Such external devices 420 include one or more devices that enable a user to interact with computer system/server 402; and/or any devices (e.g., network card, modem, etc.) that enable computer system/server 402 to communicate with one or more other computing devices. Such communication/interaction can occur via I/O interfaces 424. In some embodiments, computer system/server 402 can communicate with one or more networks such as a local area network (LAN), a general wide area network (WAN), and/or a public network (e.g., the Internet) via network adapter 426. As depicted, network adapter 426 communicates with the other components of computer system/server 402 via bus 408. It should be understood that although not shown, other hardware and/or software components could be used in conjunction with computer system/server 402. Examples, include, but are not limited to: microcode, device drivers, redundant processing units, external disk drive arrays, RAID systems, tape drives, and data archival storage systems, etc.

Computer Program Product Support

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 5:
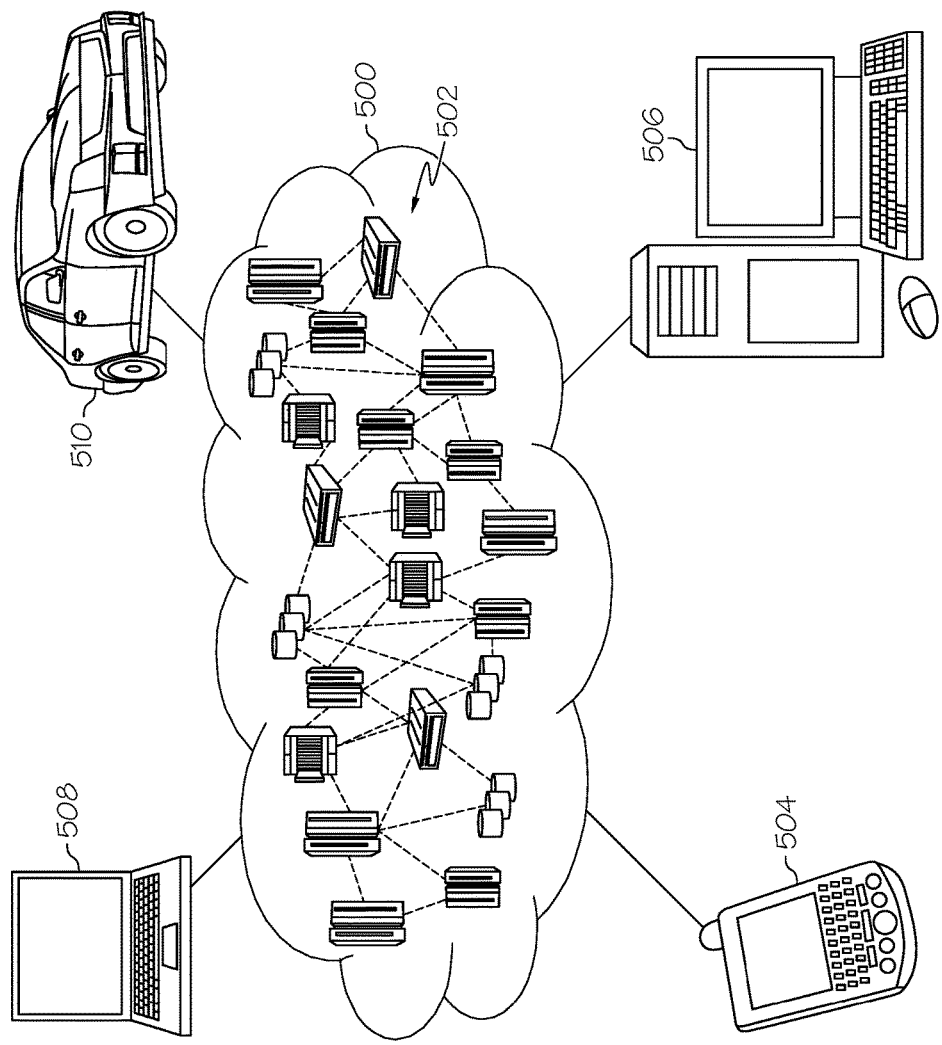
FIG. 5 illustrates one example of a cloud computing environment, in accordance with an embodiment of the present invention.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504, desktop computer 506, laptop computer 508, and/or automobile computer system 510 may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504, 506, 508, 510 shown in FIG. 5 are intended to be illustrative only and that computing nodes 502 and cloud computing environment 500 can communicate with any type of computerized device over any type of network and/or network addressable connection (e.g., using a web browser).

Figure 6:
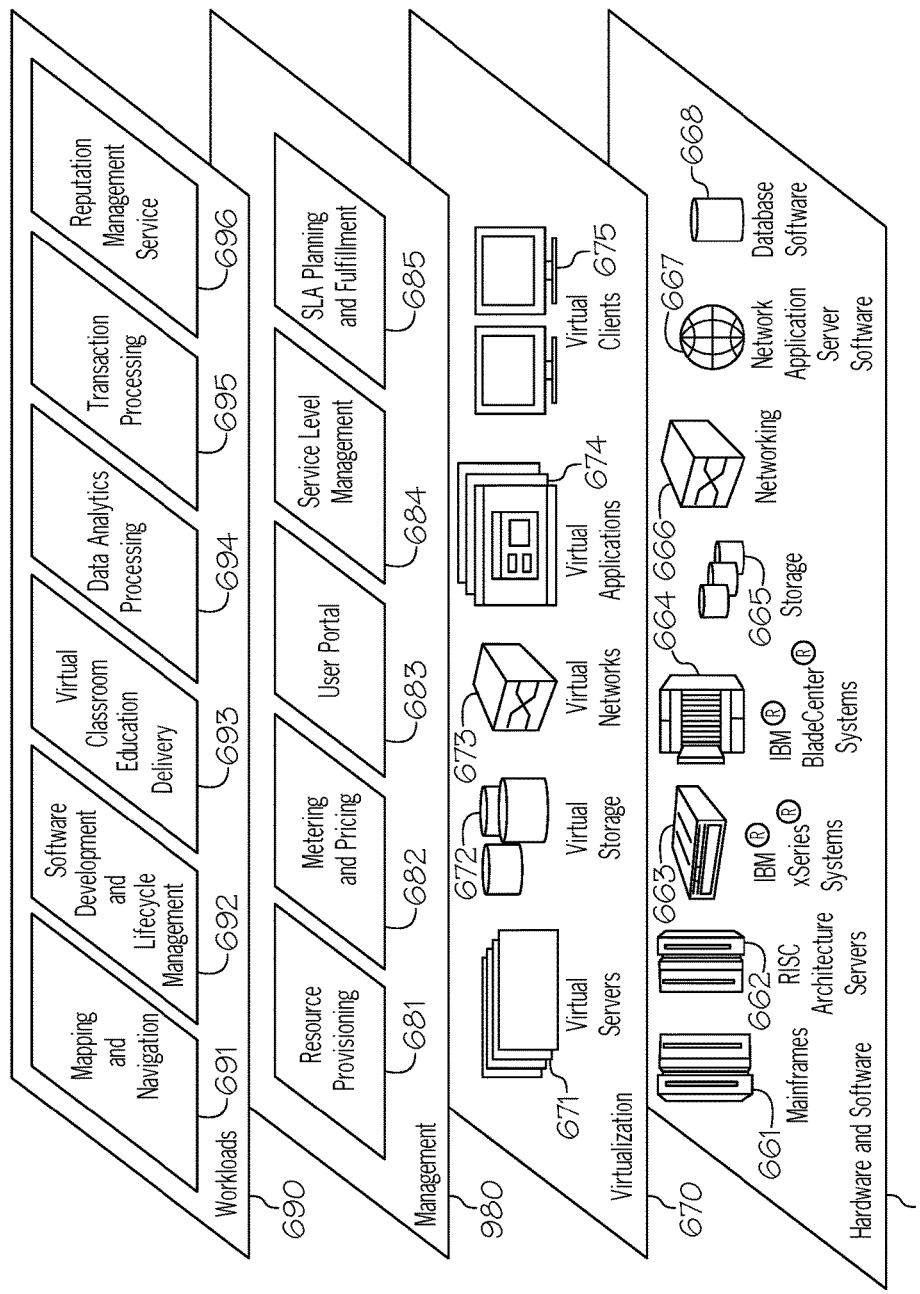
FIG. 6 illustrates abstraction model layers, in accordance with an embodiment of the present invention.

Referring now to FIG. 6, an exemplary set of functional abstraction layers provided by cloud computing environment 500 is shown. It is understood in that the components, layers, and functions shown in FIG. 6 are illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and for delivering reputation management services in accordance with embodiments of the present invention.

Non-Limiting Examples

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method on computing platform for providing a reputation service, comprising:
    receiving, from a user using a zero-knowledge protocol to ensure privacy of the user, a rating with a unique token associated with the user, and identifier of a party to be rated, wherein the unique token is previously created on a zero-knowledge verifiable computing platform associated with a certificate authority that receives a private key of the user and personally identifiable information of the user and the unique token is signed by the certificate authority without revealing an identify of the user;
    confirming the unique token is signed by the certificate authority and is associated with the user; and
    in response to confirming the unique token is associated with the user, updating a rating of the party using zero-knowledge verifiable computing.

2. The computer-implemented method of claim 1, further comprising:
    in response to the updating of the rating being successful, sending to the user an acknowledgment using the zero-knowledge protocol.

3. The computer-implemented method of claim 1, wherein the unique token is selected from the group consisting of a tax identifier, an e-passport, and a private key of a DNS Domain registered with a certificate authority.

4. The computer-implemented method of claim 1, wherein the party is a business entity.

5. The computer-implemented method of claim 1, wherein the updating the rating of the party using zero-knowledge verifiable computing includes applying a weighting factor to the rating, and wherein the weighting factor is selected from the group consisting of
    a relative strength of the rating,
    an identified group of tokens in which the unique token is a member, and
    a frequency of ratings for the party from the unique token associated with the user.

6. The computer-implemented method of claim 1, wherein the updating the rating of the party using zero-knowledge verifiable computing includes applying a weighting factor to the rating, and wherein the weighting factor is dependent on a composite set of quantities of the party within a given context.

7. The computer-implemented method of claim 6, wherein the composite set of quantities of the party within a given context is selected from the group consisting of a position of the party within an association, and a size of an association in which the party is a member.

8. The computer-implemented method of claim 7, wherein the association is selected from the group consisting of: buyers of a service or product, sellers of a service or product, service providers, service consumers, an ideological association, and a political association.

9. The computer-implemented method of claim 1, further comprising:
    receiving a query from another user of the party, the query including a composite set of qualities associated with the party, and searching the rating of the party;
    adjusting the rating of the party based upon the composite set of qualities received as part of the query.

10. The computer-implemented method of claim 9, further comprising:
    receiving a cryptocurrency from the another user for information regarding the party.

11. The computer-implemented method of claim 1, wherein the reputation service is provided as a service in a cloud environment.

12. The computer-implemented method of claim 11, wherein the certificate authority is provided as a service in a cloud environment.

13. A system for providing a reputation service, comprising:
    a memory;
    a processor communicatively coupled to the memory, where the processor is configured to perform:
        receiving, from a user using a zero-knowledge protocol to ensure privacy of the user, a rating with a unique token associated with the user, and identifier of a party to be rated, wherein the unique token is previously created on a zero-knowledge verifiable computing platform associated with a certificate authority that receives a private key of the user and personally identifiable information of the user and the unique token is signed by the certificate authority without revealing an identify of the user;
        confirming the unique token is signed by the certificate authority and is associated with the user; and
        in response to confirming the unique token is associated with the user, updating a rating of the party using zero-knowledge verifiable computing.

14. The system of claim 13, further comprising:
    in response to the updating of the rating being successful, sending to the user an acknowledgment using the zero-knowledge protocol.

15. The system of claim 13, wherein the unique token is selected from the group consisting of a tax identifier, an e-passport, and a private key of a DNS Domain registered with a certificate authority.

16. The system of claim 13, wherein the party is a business entity.

17. The system of claim 13, wherein the updating the rating of the party using zero-knowledge verifiable computing includes applying a weighting factor to the rating, and wherein the weighting factor is selected from the group consisting of
- a relative strength of the rating,
- an identified group of tokens in which the unique token is a member, and
- a frequency of ratings for the party from the unique token associated with the user.

18. The system of claim 13, wherein the updating the rating of the party using zero-knowledge verifiable computing further comprises applying a weighting factor to the rating, and wherein the weighting factor is selected from the group consisting of: a relative strength of rating on a scale from negative to positive, an identified group of tokens in which the unique token is a member, and a frequency of ratings for the party from the unique token associated with the user.

19. The system of claim 13, wherein the updating the rating of the party using zero-knowledge verifiable computing includes applying a weighting factor to the rating, and wherein the weighting factor is dependent on a composite set of quantities of the party within a given context.

20. A computer program product for providing a reputation service, comprising a computer readable storage medium having computer readable program instructions embodied therewith, the computer readable program instructions configured to cause a computer to:
- receiving, from a user using a zero-knowledge protocol to ensure privacy of the user, a rating with a unique token associated with the user, and identifier of a party to be rated, wherein the unique token is previously created on a zero-knowledge verifiable computing platform associated with a certificate authority that receives a private key of the user and personally identifiable information of the user and the unique token is signed by the certificate authority without revealing an identify of the user;
- confirming the unique token is signed by the certificate authority and is associated with the user; and
- in response to confirming the unique token is associated with the user, updating a rating of the party using zero-knowledge verifiable computing.

* * * * *